(12) United States Patent
Ortiz et al.

(10) Patent No.: US 9,959,396 B2
(45) Date of Patent: May 1, 2018

(54) SYSTEM AND METHODS FOR OBTAINING DIGITAL MULTIMEDIA FILES FROM A SERVER BASED ON OPTICALLY SCANNED DIGITAL RIGHTS MANAGEMENT INFORMATION TAG IMPRINTED ON A STORE PURCHASED COMPACT MULTIMEDIA DISK

(71) Applicants: Sofia A. Ortiz, Albuquerque, NM (US); Sharon G. Ortiz, Albuquerque, NM (US); Luis M. Ortiz, Albuquerque, NM (US)

(72) Inventors: Sofia A. Ortiz, Albuquerque, NM (US); Sharon G. Ortiz, Albuquerque, NM (US); Luis M. Ortiz, Albuquerque, NM (US)

(73) Assignee: Ortiz and Associates Consulting, LLC, Albuquerque, NM (US)

( * ) Notice: Subject to any disclaimer, the term of this patent is extended or adjusted under 35 U.S.C. 154(b) by 0 days. days.

(21) Appl. No.: 14/995,992

(22) Filed: Jan. 14, 2016

(65) Prior Publication Data

US 2016/0210466 A1    Jul. 21, 2016

Related U.S. Application Data

(60) Provisional application No. 62/103,314, filed on Jan. 14, 2015.

(51) Int. Cl.
*G06Q 30/00* (2012.01)
*G06F 21/10* (2013.01)

(52) U.S. Cl.
CPC .................................. *G06F 21/10* (2013.01)

(58) Field of Classification Search
CPC ........ B41J 2/17546; G07F 17/16; G07F 7/00; G07F 7/0866; G07F 7/1025; G07F 7/1066; G07F 17/0042; G07F 7/0806; H04N 21/2187; H04N 21/23614; H04N 21/2543; H04N 21/25883; H04N 21/4223; H04N 21/4348; H04N 1/00156; H04N 1/00196;
(Continued)

(56) References Cited

U.S. PATENT DOCUMENTS

2014/0115723 A1* 4/2014 Kothapalli ............... G06F 21/10
726/29
2014/0278978 A1* 9/2014 O'Connor .......... G06Q 30/0255
705/14.53

OTHER PUBLICATIONS

Hollington, J., The Beginner's Guide to iTunes, iLounge Article, Dec. 12, 2011, 21 pages.
(Continued)

*Primary Examiner* — Abiy Getachew

(57) ABSTRACT

System and methods for obtaining digital multimedia files from a server based on optically scanned digital rights management information tag imprinted on physical media is described. A greeting card or gift card can be provided with indicia containing a code printed thereon. Then the code can be optically scanned by client device. The code can then be provided by the client device to a remote server for retrieval of multimedia files identified by the code if the code authorizes multimedia file retrieval from the remote server by the client device. Then the client device retrieves multimedia files identified by the code from the remote server following authorization of multimedia file retrieval by the remote server based on the code.

4 Claims, 3 Drawing Sheets

(58) Field of Classification Search
CPC .............. G06F 17/3002; G06Q 20/085; G06Q 30/0613; G06Q 40/12
USPC ................................................ 705/3; 729/29
See application file for complete search history.

(56) References Cited

OTHER PUBLICATIONS

Redeem and use iTunes Gift Cards and content codes, https://support.apple.com, Dec. 22, 2014, 8 pages.
How Redbox Uses 2D Barcodes, System ID Barcode Solutions, Jan. 14, 2010, 2 pages.

* cited by examiner

SYSTEM AND METHODS FOR OBTAINING DIGITAL MULTIMEDIA FILES FROM A SERVER BASED ON OPTICALLY SCANNED DIGITAL RIGHTS MANAGEMENT INFORMATION TAG IMPRINTED ON A STORE PURCHASED COMPACT MULTIMEDIA DISK

INVENTION PRIORITY

The present invention claims priority as a continuation application to U.S. Provisional Patent Application Ser. No. 62/103,314, entitled "System and Methods for Obtaining Digital Multimedia Files from a Server Based on Optically Scanned Digital Rights Management Information Tag Imprinted on a Store Purchased Compact Multimedia Disk." filed Jan. 14, 2015, which is herein incorporated by reference in its entirety.

BACKGROUND

Compact multimedia disks such as CDs and DVDs containing multimedia (e.g., songs, movies, software) are still available for purchase form retail stores. Nowadays, patrons purchasing these compact disks may only have a CD/DVD player (typically located in their car if a CD) to process information on the multimedia disks (hereinafter both referred to as "CD"). A growing number of everyday consumers do not have a CD reader associated with a personal computer (let alone a personal computer) that can retrieve and process digital files obtained optically from CDs for digital rights management processing (i.e., for authenticating that rights to access/use media are valid and providing access to/use of the media after authentication).

What the present inventors believe is needed is an alternate and novel way to obtain files associated with a CD purchase by using a serial number or optical tags (e.g., bar codes, QR codes) imprinted on purchased CDs that can be scanned in order to access, process and enjoy, without a computer-based CD reader or player, the digital files associated with the media also contained on the purchased CD, and bearing a single-use license to the patron once purchased, that are stored on a remote server of a vendor (e.g., iTunes store, Google Play Store) that sells, licenses and manages copyrighted multimedia.

SUMMARY OF EMBODIMENTS

In order to overcome the limitations currently existing in the art, the present inventors provide systems and methods for obtaining digital multimedia files from a server after optically reading a scannable digital rights management information tag imprinted on a store-purchased items (e.g., compact disk, greeting card) and utilizing the tag to authenticate rights bestowed upon on the user so that the user can obtain digital files for the media from a vendor's remote server (e.g., iTunes store, Google Play Store, Amazon) for processing by a digital rights management service (e.g., iTunes™, Google Play™, etc.), and that are accessible by and associated with the user, wherein the user can obtain and render the media via the digital rights management service on a device operated by the user (e.g., portable devices, a smartphone, a tablet computer, or a laptop computer).

It is also a feature of the present invention to enable a purchaser and licensee thereby of media to provide it as a gift to another person once purchased using the digital rights management service. Gift cards are often provided as gifts but merely provide the recipient with a dollar amount (credit) to spend with a vendor. Instead, in accordance with features of the present invention, the purchaser can customize an arrangement of media (e.g., songs and pictures) and provide it as a gift to the recipient via a unique code (e.g., barcode or QR code) that can be imprinted on a greeting card (e.g., birthday card), or associated with a gift card, or that can also be obtained from the vendor electronically during a transaction with its server. The recipient can then enjoy media that was custom arranged by the initial purchase and gift-giver.

Rights to digital media (e.g., music or videos) can be purchased and then transferred to a recipient as a gift for their use. But if the recipient already had rights to some of the media provided in the arrangement (e.g., duplicate of songs from the same recording artist), then the digital rights management service can offer/provide the recipient the ability to redeem the received media for alternative media of the same value. The redemption period can also be provided for a limited time period, and at a discount, or the value can diminish over time.

DETAILED DESCRIPTION

Figure 1:
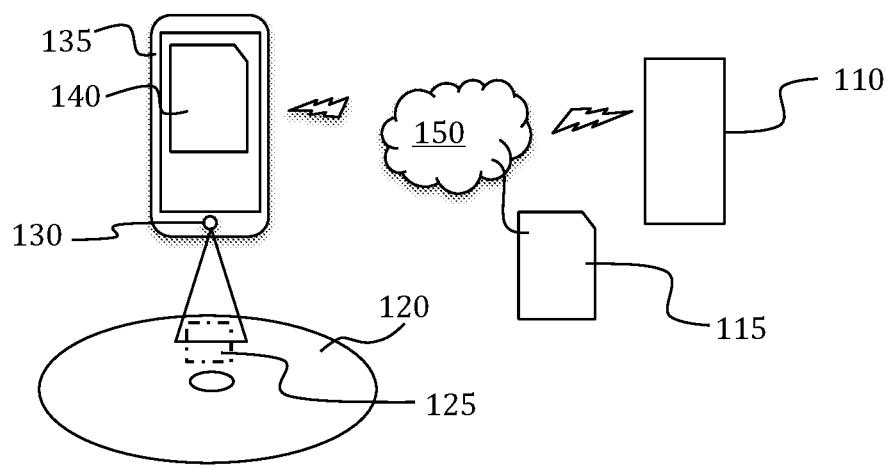
FIG. 1 illustrates a system in accordance with the embodiments.

Referring to the following figure, aspects of the present invention provides a system and methods for transferring media files from a digital rights vending server 110 (e.g., iTunes store) into a media rights management service account 115 (e.g., iTunes account) that can be accessed over a data network 150. The media rights management account 115 is associated with a purchaser of physical media 120 (e.g., a compact disk or greeting card) bearing an optically retrievable DRM code 125 printed thereon.

With respect to a CD, the purchaser can physically procure the physical media 120 in the form of a CD and bearing embedded digital multimedia data (e.g., music, video) therein from a store and can optically scan the optically retrievable DRM code 125 (e.g., bar code or QR code) imprinted on a printable area of the CD 120 with a an optical scanner 130 incorporated in a wireless handheld device 135 (e.g., smartphone or tablet computer). The optical scanner can be provided in the form of a digital camera. The wireless handheld device can also nm an application 140 (e.g., iTunes) that can further enable access to and rendering (e.g., playing, displaying, executing) of digital files associated with digital media stored in or accessible with the wireless handheld device 135. Digital media can be accessed from either or both of the digital rights vending server 110 and media rights management service account 115. The wireless handheld device 135 can access the digital rights management service application 140 (iTunes) and provide the optical code information retrieved from optically retrievable DRM code 125 to the remote sever 110 or the media rights management account 115 to access and download digital files (e.g., songs, videos) representing the digital media information that can also be stored on the CD 120. The purchaser can then access the same digital media files contained on the CD 120 from the media rights management service 115 without requiring an optical reader 130 typically mounted in desktop computers to read/obtain the same files embedded on the CD 120 for storage on the wireless handheld device 135, or a remotely accessible account 115 associated therewith.

Figure 2:
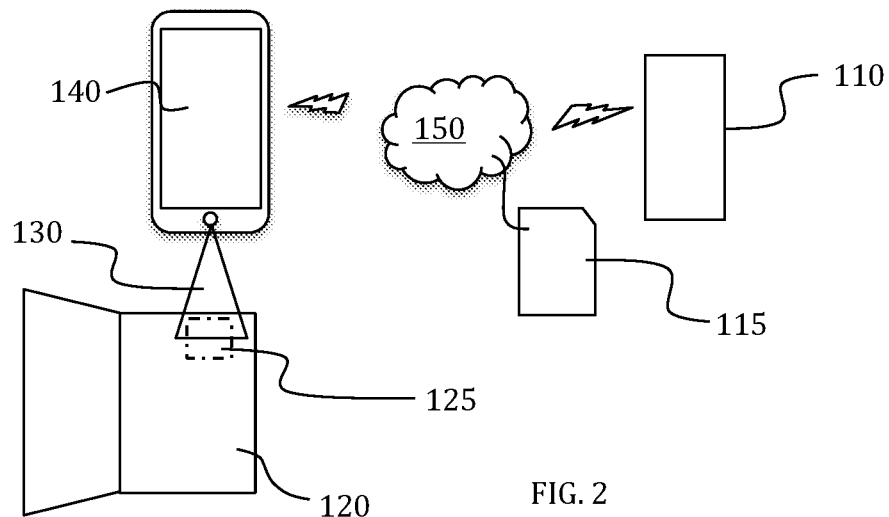
FIG. 2 illustrates another system in accordance with the embodiments.

Referring to FIG. 2, in accordance with another embodiment, a purchaser can create a unique multimedia package as a gift for a target recipient, the purchaser can arrange any mixture of personalized messages, pictures, videos and music and store the final gift package as a file on a server 110 accessible via the digital rights management service account 115. The unique code can be provided in the form of optically retrievable DRM code 125 printed on a physical card 120 (e.g., birthday card), rather than a CD, or can be associated with the serial number or indicia code also imprinted on a gift card (e.g., iTunes gift card) that can be physically provided to the gift recipient. The gift recipient can then access the package from the server 110 by logging into (or setting up then logging into) their own digital rights management service account (e.g., like purchaser's account 115), or the account can be opened automatically after scanning the optically retrievable DRM code 125. The gift recipient can then render (play) the multimedia presentation or gifted multimedia (e.g., video, songs) on their wireless handheld device 135 (e.g., smartphone, tablet, laptop computer). If the media includes a gift of music or video by artists available for purchase from a vendor (e.g., iTunes store) accessible from the digital rights management service (e.g., iTunes application 140 running on an iPhone), and the gift recipient already has the same media, then as described hereinbefore the recipient can trade the gifted media for new media (perhaps of like value) that may be available from the vendor. The trade can be facilitated by the digital rights management service 140 via the gifted user's account 115 and the vendor server 110. Optionally, the time period to trade media can be limited, or the amount of credit can be reduced upon redemption as time goes on.

Figure 3:
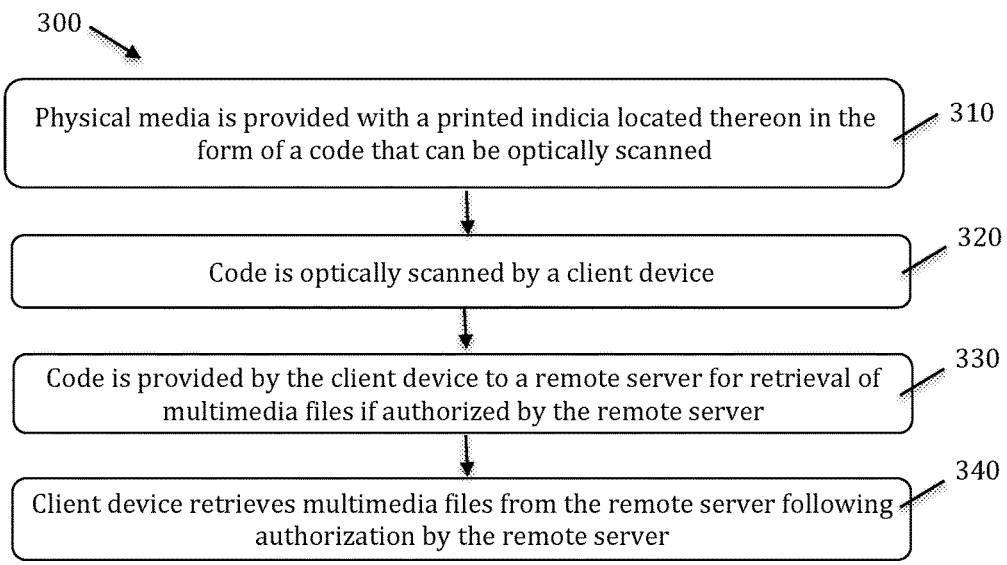
FIG. 3 illustrates a flow diagram of a method in accordance with the embodiments.

Referring to FIG. 3, a flow diagram 300 of a process in accordance with features of the present embodiment is illustrated. As shown in Block 310, physical media is provided with a printed indicia located thereon in the form of a code that can be optically scanned. As shown in Block 320, the code is optically scanned by a client device (e.g., cell phone, tablet). As shown in Block 330, the code is provided by the client device to a remote server for retrieval of multimedia files, if authorized by the remote server. Then, as shown in Block 340, the client device retrieves multimedia files from the remote server following authorization by the remote server.

Figure 4:
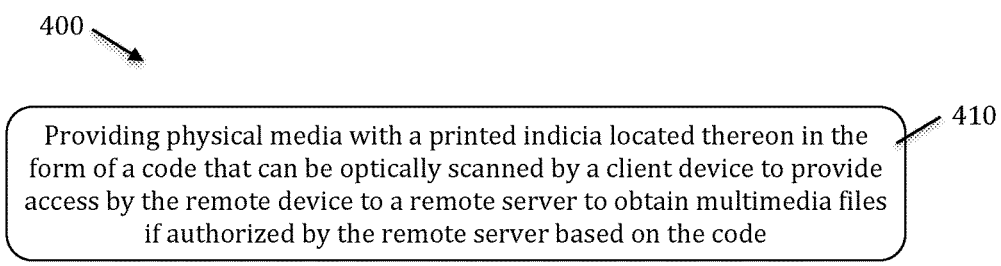
FIG. 4 illustrates a flow diagram of a method in accordance with the embodiments.

Referring to FIG. 4, a flow diagram 400 of a process in accordance with features of the present embodiment is illustrated. As shown in Block 410, physical media is provided with a printed indicia located thereon in the form of a code that can be optically scanned by a client device to provide access by the remote device to a remote server to obtain multimedia files if authorized by the remote server based on the code.

Figure 5:
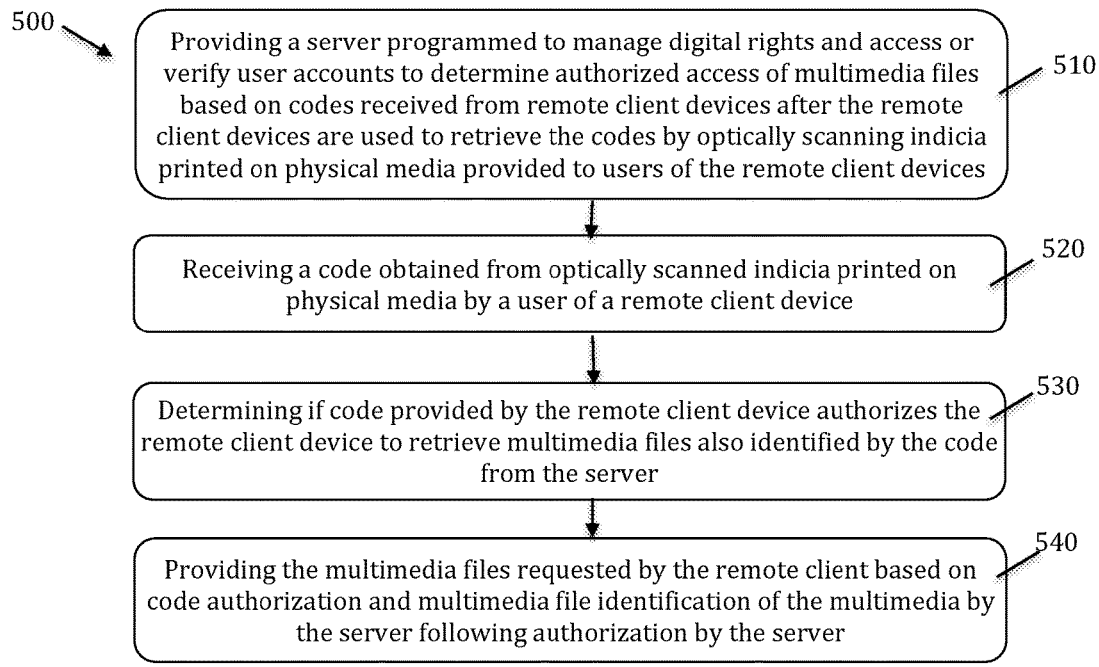
FIG. 5 illustrates a flow diagram of a method in accordance with the embodiments.

Referring to FIG. 5, a flow diagram 500 of a process in accordance with features of the present embodiment is illustrated. As shown in Block 510, a server is provided that is programmed to manage digital rights and access or verify user accounts to determine authorized access of multimedia files based on codes received from remote client devices after the remote client devices are used to retrieve the codes by optically scanning indicia printed on physical media provided to users of the remote client devices. As shown in Block 520, the server receives a code obtained from optically scanned indicia printed on physical media by a user of a remote client device. As shown in Block 530, the server determines if code provided by the remote client device authorizes the remote client device to retrieve multimedia files also identified by the code from the server. Then as shown in Block 540, the server provides the multimedia files requested by the remote client based on code authorization and multimedia file identification of the multimedia by the server following authorization by the server.

Figure 6:
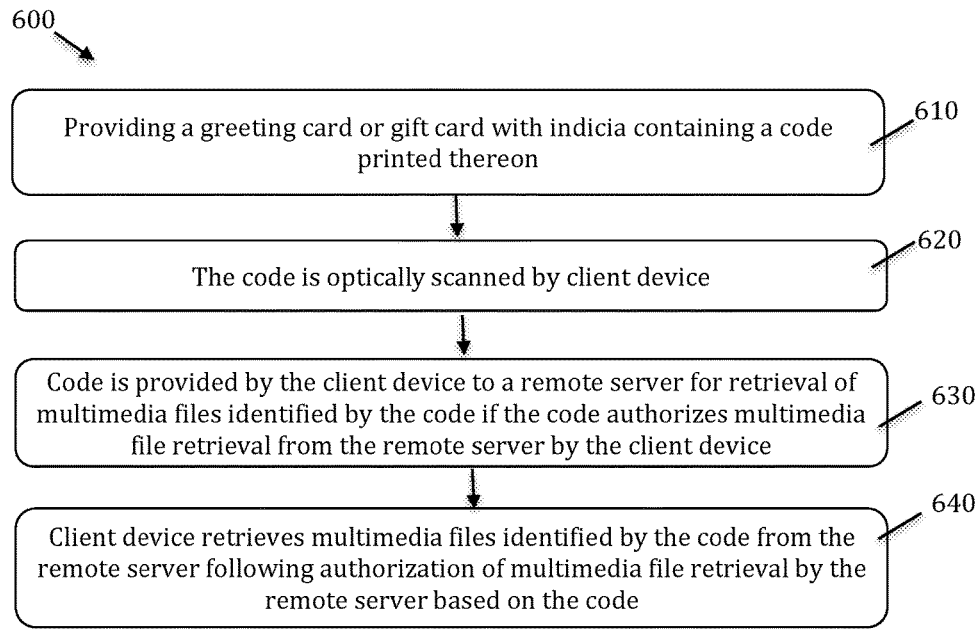
FIG. 6 illustrates a flow diagram of a method in accordance with the embodiments.

Referring to FIG. 6, a flow diagram 600 of a process in accordance with features of the present embodiment is illustrated. As shown in Block 610, a greeting card or gift card is provided with indicia containing a code printed thereon. Then as shown in Block 620, the code is optically scanned by client device. As shown in Block 630, the code is provided by the client device to a remote server for retrieval of multimedia files identified by the code if the code authorizes multimedia file retrieval from the remote server by the client device. Then as shown in Block 640, Client device retrieves multimedia files identified by the code from the remote server following authorization of multimedia file retrieval by the remote server based on the code.

The ability to create unique media for gifting and enables media trading can translate in to new revenue for multimedia rights vendors such as iTunes and Google Play. The creation process could also create revenue for what is believed by many to be a dying greeting card industry (e.g., Hallmark), which is offering eCards (digital files containing personalized messages that can be delivered via email and that can be rendered on a computer as a multimedia presentation) in addition to physical cards that can be purchased at stores. Collaboration between Hallmark and iTunes (for example) could actually benefit both companies with increased sales associated with gifting and benefiting from increased sales for special occasions celebrated by consumers.

The invention claimed is:

1. A method for digital rights management, comprising:
providing a store purchased greeting card including an indicia containing a code printed thereon to a purchaser for presentation as a gift to a greeting card recipient, wherein the purchaser accesses a remote server using the code represented by the indicia to customize an arrangement of media to present as a gift to a gift recipient to use with a client device associated with the gift recipient for scanning the code imprinted on the store purchased greeting card to retrieve the media arranged by the purchaser and render the media on the client device;
receiving the code over a data network from the client device at a remote server for retrieval of the media arranged by the purchaser and identified by the code if the code authorizes multimedia file retrieval from the remote server by the client device; and
retrieving the media arranged by the purchaser and identified by the code from the remote server with the client device following authorization of multimedia file retrieval by the remote server based on the code and transmitting the multimedia files for rendering of the gift by the gift recipient on the client device.

2. The method of claim 1, including the step of enabling the gift recipient to exchange song or video content represented by the multimedia files for alternate data including at least one of music, videos.

3. A digital rights management system, comprising:
a server configured to authenticate users and enable users to arrange media, store media, and access media, the server including programming to:
provide a purchaser of a store purchased greeting card including an indicia containing a code printed thereon to a purchaser for presentation as a gift to a greeting card recipient accesses to the remote server using the code represented by the indicia to customize an arrangement of media including a personalized message from the purchaser, pictures or video of at least one of the purchaser or recipient, and music chosen by the purchaser to present to a gift recipient to use with a client device associated with the gift recipient for scanning the code imprinted on the store purchased greeting card using an optical scanner integrated within the client device to scan and retrieve the media arranged by the purchaser from a remote server and render the media on the client device; receive the code over a data network from the client device at the server for retrieval of the media arranged by the purchaser and identified by the code if the code authorizes multimedia file retrieval from the server by the client device; and retrieve the media arranged by the purchaser and arranged by the purchaser and identified by the code from the server with the client device following authorization of multimedia file retrieval by the server based on the code and transmitting the multimedia files for rendering of the gift by the recipient on a display screen also integrated in the client device; and a data network connection to enable communication by the server with client devices used by purchasers and gift recipients.

4. A method for digital rights management, comprising:
providing a store purchased greeting card including an indicia containing a code printed thereon to a purchaser for presentation as a gift to a greeting card recipient, wherein the purchaser accesses a remote server using the code represented by the indicia to customize an arrangement of media including a personalized message from the purchaser, pictures or video of at least one of the purchaser or recipient, and music chosen by the purchaser to present as a gift to a gift recipient to use with a client device associated with the gift recipient for scanning the code imprinted on the store purchased greeting card using an optical scanner integrated within the client device to scan and retrieve the media arranged by the purchaser from a remote server and render the media on a display screen also integrated in the client device;
receiving the code over a data network from the client device at a remote server for retrieval of the media arranged by the purchaser and identified by the code if the code authorizes multimedia file retrieval from the remote server by the client device; and
retrieving the media arranged by the purchaser and identified by the code from the remote server with the client device following authorization of multimedia file retrieval by the remote server based on the code and transmitting the multimedia files for rendering of the gift by the gift recipient on the client device.

* * * * *